United States Patent
Matsumoto et al.

(10) Patent No.: US 11,059,751 B2
(45) Date of Patent: Jul. 13, 2021

(54) COATED MEMBER, COATING MATERIAL, AND METHOD OF MANUFACTURING COATED MEMBER

(71) Applicant: MITSUBISHI HEAVY INDUSTRIES AERO ENGINES, LTD., Komaki (JP)

(72) Inventors: Mineaki Matsumoto, Tokyo (JP); Takayuki Kurimura, Tokyo (JP); Kosuke Nishikawa, Tokyo (JP); Tadayuki Hanada, Komaki (JP)

(73) Assignee: MITSUBISHI HEAVY INDUSTRIES AERO ENGINES, LTD., Komaki (JP)

( * ) Notice: Subject to any disclaimer, the term of this patent is extended or adjusted under 35 U.S.C. 154(b) by 230 days.

(21) Appl. No.: 15/549,516

(22) PCT Filed: Feb. 9, 2016

(86) PCT No.: PCT/JP2016/053786
§ 371 (c)(1),
(2) Date: Aug. 8, 2017

(87) PCT Pub. No.: WO2016/129588
PCT Pub. Date: Aug. 18, 2016

(65) Prior Publication Data
US 2018/0022649 A1 Jan. 25, 2018

(30) Foreign Application Priority Data

Feb. 9, 2015 (JP) .............................. JP2015-023374

(51) Int. Cl.
*C04B 35/488* (2006.01)
*C04B 35/48* (2006.01)
(Continued)

(52) U.S. Cl.
CPC ............ *C04B 35/481* (2013.01); *C04B 35/10* (2013.01); *C04B 35/16* (2013.01); *C04B 35/486* (2013.01);
(Continued)

(58) Field of Classification Search
CPC ................ C04B 35/481; C04B 35/488; C04B 35/62675; C04B 41/009; C04B 41/5024;
(Continued)

(56) References Cited

U.S. PATENT DOCUMENTS 6,296,941 B1  10/2001  Eaton, Jr. et al.
6,312,763 B1  11/2001  Eaton, Jr. et al.
(Continued)

FOREIGN PATENT DOCUMENTS

EP     2503027 A1    9/2012
JP     H11-012050 A  1/1999
(Continued)

OTHER PUBLICATIONS

PCT/ISA/210, "International Search Report for International Application No. PCT/JP2016/053786," dated Mar. 8, 2016.
(Continued)

*Primary Examiner* — Jonathan C Langman
(74) *Attorney, Agent, or Firm* — Manabu Kanesaka; Benjamin Hauptman; Kenneth Berner (57) ABSTRACT

A coated member includes a heat-shielding coating layer made of a zirconia-dispersed silicate in which ytterbia-stabilized zirconia is precipitated as a dispersed phase in a matrix phase which is any one of a rare earth disilicate, a rare earth monosilicate, and a mixed phase of the rare earth disilicate and the rare earth monosilicate. The rare earth disilicate is a $(Y_{1-a}[Ln_1]_a)_2Si_2O_7$ solid solution wherein $Ln_1$ is any one of Sc, Yb, and Lu, or a $(Y_{1-c}[Ln_2]_c)_2Si_2O_7$ solid solution wherein $Ln_2$ is any one of Nd, Sm, Eu, and Gd. The
(Continued)

rare earth monosilicate is $Y_2SiO_5$, $[Ln_1']_2SiO_5$, a $(Y_{1-b}[Ln_1']_b)_2SiO_5$ solid solution wherein $Ln_1'$ is any one of Sc, Yb, and Lu, or a $(Y_{1-d}[Ln_2']_d)_2SiO_5$ solid solution wherein $Ln_2'$ is any one of Nd, Sm, Eu, and Gd.

10 Claims, 6 Drawing Sheets

(51) Int. Cl.

| | |
|---|---|
| F23R 3/42 | (2006.01) |
| F01D 5/28 | (2006.01) |
| C04B 35/626 | (2006.01) |
| C23C 4/11 | (2016.01) |
| C04B 41/00 | (2006.01) |
| C04B 41/50 | (2006.01) |
| C04B 35/653 | (2006.01) |
| C04B 35/80 | (2006.01) |
| C04B 35/16 | (2006.01) |
| C04B 35/565 | (2006.01) |
| C04B 41/85 | (2006.01) |
| C23C 28/04 | (2006.01) |
| C04B 35/10 | (2006.01) |
| C04B 35/486 | (2006.01) |

(52) U.S. Cl.
CPC .......... *C04B 35/488* (2013.01); *C04B 35/565* (2013.01); *C04B 35/62675* (2013.01); *C04B 35/653* (2013.01); *C04B 35/803* (2013.01); *C04B 35/806* (2013.01); *C04B 41/009* (2013.01); *C04B 41/5024* (2013.01); *C04B 41/85* (2013.01); *C23C 4/11* (2016.01); *C23C 28/042* (2013.01); *C23C 28/044* (2013.01); *F01D 5/288* (2013.01); *F23R 3/42* (2013.01); *C04B 2235/3224* (2013.01); *C04B 2235/3225* (2013.01); *C04B 2235/3246* (2013.01); *C04B 2235/5224* (2013.01); *C04B 2235/5244* (2013.01); *C04B 2235/5436* (2013.01); *C04B 2235/5445* (2013.01); *C04B 2235/5454* (2013.01); *C04B 2235/76* (2013.01); *C04B 2235/9607* (2013.01); *F05D 2300/15* (2013.01); *F05D 2300/211* (2013.01); *Y02T 50/60* (2013.01)

(58) Field of Classification Search
CPC ... C04B 35/653; C04B 35/803; C04B 35/806; C04B 35/16; C04B 35/565; C04B 41/85; C04B 35/10; C04B 35/486; C04B 2235/5436; C04B 2235/5445; C04B 2235/76; C04B 2235/9607; C04B 2235/3246; C04B 2235/5244; C04B 2235/5224; C04B 2235/3224; C04B 2235/3225; F23R 3/42; F01D 5/288; C23C 4/11; C23C 28/044; C23C 28/042; Y02T 50/60; F05D 2300/15; F05D 2300/211

See application file for complete search history.

(56) References Cited

U.S. PATENT DOCUMENTS

| | | | |
|---|---|---|---|
| 6,733,908 B1 * | 5/2004 | Lee ........................ | C04B 35/185 |
| | | | 428/702 |
| 6,759,151 B1 * | 7/2004 | Lee ........................ | C04B 41/009 |
| | | | 428/701 |
| 7,348,287 B2 | 3/2008 | Mechnich | |
| 2003/0087120 A1 * | 5/2003 | Torigoe ............... | C23C 28/3215 |
| | | | 428/633 |
| 2003/0138641 A1 * | 7/2003 | Fukudome ............ | C04B 35/486 |
| | | | 428/446 |
| 2004/0156724 A1 * | 8/2004 | Torigoe ..................... | C23C 4/18 |
| | | | 416/241 R |
| 2004/0175597 A1 * | 9/2004 | Litton ..................... | C04B 35/01 |
| | | | 428/702 |
| 2006/0014029 A1 * | 1/2006 | Saak ...................... | C04B 41/009 |
| | | | 428/446 |
| 2006/0073361 A1 | 4/2006 | Fukudome et al. | |
| 2006/0100086 A1 | 5/2006 | Mechnich | |
| 2006/0166015 A1 | 7/2006 | Spitsberg et al. | |
| 2007/0151481 A1 | 7/2007 | Akiyama et al. | |
| 2008/0160172 A1 | 7/2008 | Taylor et al. | |
| 2008/0213617 A1 | 9/2008 | Taylor et al. | |
| 2008/0220209 A1 | 9/2008 | Taylor et al. | |
| 2009/0220776 A1 | 9/2009 | Meschter et al. | |
| 2009/0250153 A1 | 10/2009 | Meschter et al. | |
| 2010/0080984 A1 * | 4/2010 | Lee ......................... | C04B 35/16 |
| | | | 428/334 |
| 2010/0159151 A1 | 6/2010 | Kirby et al. | |
| 2011/0027557 A1 | 2/2011 | Kirby et al. | |
| 2011/0256411 A1 | 10/2011 | Courcot et al. | |
| 2012/0003102 A1 | 1/2012 | Taylor et al. | |
| 2012/0122651 A1 | 5/2012 | Taylor et al. | |
| 2012/0244383 A1 | 9/2012 | Meschter et al. | |
| 2013/0228105 A1 | 9/2013 | Yamamura et al. | |
| 2013/0316891 A1 | 11/2013 | Harada et al. | |
| 2013/0330507 A1 | 12/2013 | Taylor et al. | |
| 2014/0178632 A1 | 6/2014 | Taylor et al. | |
| 2014/0334939 A1 | 11/2014 | Taylor et al. | |
| 2016/0108510 A1 * | 4/2016 | Kirby ..................... | C23C 4/129 |
| | | | 428/215 |

FOREIGN PATENT DOCUMENTS

| | | |
|---|---|---|
| JP | 2003-160852 A | 6/2003 |
| JP | 2005-154885 A | 6/2005 |
| JP | 2006-028015 A | 2/2006 |
| JP | 2006-151720 A | 6/2006 |
| JP | 2006-200037 A | 8/2006 |
| JP | 3866002 B2 | 1/2007 |
| JP | 2007-091504 A | 4/2007 |
| JP | 2008-308374 A | 12/2008 |
| JP | 4453718 B2 | 4/2010 |
| JP | 2011-046598 A | 3/2011 |
| JP | 4690709 B2 | 6/2011 |
| JP | 2012-082994 A | 4/2012 |
| JP | 2012-513946 A | 6/2012 |
| JP | 5112681 B2 | 1/2013 |
| JP | 2015-172243 A | 10/2015 |
| WO | 2012/077787 A1 | 6/2012 |

OTHER PUBLICATIONS

PCT/ISA/237, "Written Opinion of the International Searching Authority for International Application No. PCT/JP2016/053786," dated Mar. 8, 2016.

Europe Patent Office, "Search Report for European Patent Application No. 16749232.1," dated Dec. 13, 2017.

Carrion, A. J. F. et al, "Structural and kinetic study of phase transitions in LaYSi2O7," Journal of the European Ceramic Society, Aug. 2012, p. 2477-2486, vol. 32, Issue 10, Elsevier Ltd.

Monteverde, F. et al., "Structural data from X-ray powder diffraction for new high-temperature phases (Y1-xLnx) 2Si2O7 with Ln=Ce, Pr, Nd," Journal of the European Ceramic Society, May 2002, p. 721-730, vol. 22, Issue 5, Elsevier Science Ltd.

Zhang, Q. Y. et al., "Effects of composition and structure on spectral properties of Eu3+-doped yttrium silicate transparent nanocrystalline films by metallorganic decomposition method," Chemical Physics Letters, Apr. 2002, p. 161-167, vol. 356, Issues 1-2, Elsevier Science B.V.

Maier, N. et al, "Formation and stability of Gd, Y, Yb and Lu disilicates and their solid solutions," Journal of Solid State Chemistry, Jun. 2006, p. 1630-1635,vol. 179, No. 6, Elsevier Inc.

(56) References Cited

OTHER PUBLICATIONS

U.S.P.T.O, "Office Action for U.S. Appl. No. 15/549,658," dated Aug. 24, 2020.

\* cited by examiner

COATED MEMBER, COATING MATERIAL, AND METHOD OF MANUFACTURING COATED MEMBER

RELATED APPLICATIONS

The present application is National Phase of International Application No. PCT/JP2016/053786 filed Feb. 9, 2016, and claims priority from Japanese Application No. 2015-023374, filed Feb. 9, 2015, the disclosure of which is hereby incorporated by reference herein in its entirety.

TECHNICAL FIELD

The present invention relates to a coated member, a method of manufacturing the same, and a coating material, and more particularly, to a member which is used in a high-temperature environment and on which a heat-shielding coating layer is formed.

BACKGROUND ART

Since an oxide-based ceramic fiber-reinforced oxide-based ceramic matrix composite (oxide CMC) such as an $Al_2O_3$ fiber-reinforced $Al_2O_3$ matrix composite, a SiC fiber-reinforced SiC matrix composite (CMC), or silicon-based ceramics such as SiC, $Si_3N_4$, and the like, is lightweight and has excellent mechanical properties at a high temperature, these materials are promising materials as high-temperature members of aircraft engine, industrial gas turbines, and the like. Particularly, since the $Al_2O_3$ fiber-reinforced $Al_2O_3$ matrix composite is cheaper than the SiC fiber-reinforced SiC matrix composite, the $Al_2O_3$ fiber-reinforced $Al_2O_3$ matrix composite is a promising material as a member for aircraft engines.

However, since the $Al_2O_3$ fiber-reinforced $Al_2O_3$ matrix composite has a heat resistant temperature of about 1000° C., in the case of applying the $Al_2O_3$ fiber-reinforced $Al_2O_3$ matrix composite to the aircraft engines, the industrial gas turbines, or the like, there is a need to form a heat-shielding coating layer on an outermost surface thereof.

In a general heat-shielding coating layer, yttria-stabilized zirconia ($Y_2O_3$—$ZrO_2$) has been used. The yttria-stabilized zirconia has a low thermal conductivity of 1.5 W/mK. However, since phase stability of the yttria-stabilized zirconia is not sufficient at a high temperature, phase transformation accompanied with a volume change can occur after using the yttria-stabilized zirconia for a long period of time, such that the heat-shielding coating layer can be damaged.

Patent Document 1 suggests that a ytterbia-stabilized zirconia ($Yb_2O_3$—$ZrO_2$) having excellent phase stability at a high temperature as compared to yttria-stabilized zirconia is used in a heat-shielding coating layer.

Patent Document 2 discloses formation of a heat-shielding coating layer in which $ZrO_2$ particles are dispersed on a surface of $Y_2SiO_5$ corresponding to a matrix phase on a surface of an oxide CMC.

For example, since in a gas turbine combustion environment, a gas turbine is operated in a high-temperature and high-pressure steam oxidation environment, the silicon-based ceramic or the ceramic fiber-reinforced ceramic matrix composite becomes corroded and thinned due to steam while being oxidized, such that durability is remarkably deteriorated.

Therefore, environmental barrier coating is performed on a surface of the silicon-based ceramic or the ceramic fiber-reinforced ceramic matrix composite. Patent Document 3 discloses a coating made of yttrium silicate. Patent Document 4 discloses a coating made of $Lu_2Si_2O_7$.

Patent Document 5 discloses a coating made of a monosilicate of a rare earth element such as Lu, Yb, or Y (that is, rare earth monosilicate), a disilicate of the rare earth element (that is, rare earth disilicate), or a combination thereof. In the technology in Patent Document 5, a coating film of a rare earth monosilicate is formed on a substrate and subjected to heat-treatment in an oxygen-containing environment, thereby partially converting the rare earth monosilicate to the rare earth disilicate.

CITATION LIST

Patent Literature

{PTL 1}
  Japanese Unexamined Patent Application, Publication No. 2003-160852
{PTL 2}
  U.S. Pat. No. 7,348,287
{PTL 3}
  The publication of Japanese Patent No. 3866002
{PTL 4}
  The publication of Japanese Patent No. 4690709
{PTL 5}
  Japanese Unexamined Patent Application, Publication No. 2006-28015

SUMMARY OF INVENTION

Technical Problem

A thermal expansion coefficient of ytterbia-stabilized zirconia is $10.3 \times 10^{-6}$/K (addition amount of $Yb_2O_3$: 16 wt %). Meanwhile, a thermal expansion coefficient of an $Al_2O_3$ fiber-reinforced $Al_2O_3$ matrix composite is $6 \times 10^{-6}$/K to $8 \times 10^{-6}$/K, and a thermal expansion coefficient of a SiC fiber-reinforced SiC matrix composite is $3.5 \times 10^{-6}$/K to $4.5 \times 10^{-6}$/K or so, such that the thermal expansion coefficients of these materials are significantly smaller than that of the ytterbia-stabilized zirconia. Therefore, in the case of using the $Al_2O_3$ fiber-reinforced $Al_2O_3$ matrix composite or the SiC fiber-reinforced SiC matrix composite as a substrate, and directly forming a heat-shielding coating layer made of ytterbia-stabilized zirconia on a surface of the substrate to manufacture a high-temperature member, there has been a problem in that the heat-shielding coating layer can be delaminated by repeatedly using the high-temperature member.

A thermal expansion coefficient of a rare earth disilicate is close to that of the substrate (for example, $Y_2Si_2O_7$ has a thermal expansion coefficient of $3.7 \times 10^{-6}$/K at 1000° C.). Therefore, in the case of laminating a layer of the rare earth disilicate on the substrate, it is possible to alleviate thermal stress during use at a high temperature to prevent a coating from being delaminated. However, since the rare earth disilicate has a high activity of $SiO_2$, the rare earth disilicate can react with steam under a high-temperature and high-pressure steam oxidation environment, thereby being easily eroded.

Since $Y_2Si_2O_7$ is a relatively cheap material among the rare earth disilicates, $Y_2Si_2O_7$ is advantageous in view of cost for coating large-area substrates of aircraft engines, gas turbines, and the like. However, since phase transformation of $Y_2Si_2O_7$ ($\gamma \rightarrow \beta$) accompanied with a volume change can occur in the vicinity of 1300° C., coating can be damaged during use at the high temperature.

A rare earth monosilicate has excellent steam resistance as compared to the rare earth disilicate, but at the time of using the rare earth monosilicate at a high temperature for a long period of time, the rare earth monosilicate reacts with steam, such that it is impossible to ignore erosion of a coating caused by volatilization of $SiO_2$. Since the rare earth monosilicate has a high thermal expansion coefficient, in the case of forming a layer of the rare earth monosilicate on the substrate, delamination due to thermal stress can occur.

Further, there is a problem in that erosion resistance of rare earth silicates at a high temperature is not sufficient.

An object of the present invention is to provide a coated member in which a heat-shielding coating layer capable of having a good heat-shielding property, suppressing a coating film from being damaged in a high-temperature environment, and having excellent steam resistance and erosion resistance is formed, and a method of manufacturing the same. Another object of the present invention is to provide a coating material capable of being used as a raw material of the heat-shielding coating layer.

Solution to Problem

According to a first aspect of the present invention, there is provided a coated member including: a heat-shielding coating layer on a substrate made of a silicon-based ceramic or a ceramic fiber-reinforced ceramic matrix composite, wherein the heat-shielding coating layer is a layer made of a zirconia-dispersed silicate in which ytterbia-stabilized zirconia is precipitated as a dispersed phase in a matrix phase which is any one of a rare earth disilicate, a rare earth monosilicate, and a mixed phase of the rare earth disilicate and the rare earth monosilicate, the rare earth disilicate being any one of a $(Y_{1-a}[Ln_1]_a)_2Si_2O_7$ solid solution (here, $Ln_1$ is any one of Sc, Yb, and Lu, a is 0.05 or more and less than 1 when $Ln_1$ is Sc, and a is 0.2 or more and less than 1 when $Ln_1$ is Yb or Lu), $Sc_2Si_2O_7$, $Yb_2Si_2O_7$, and $Lu_2Si_2O_7$, the rare earth monosilicate being $Y_2SiO_5$, $[Ln_1']_2SiO_5$, or a $(Y_{1-b}[Ln_1']_b)_2SiO_5$ solid solution (here, $Ln_1'$ is any one of Sc, Yb, and Lu, and $0<b\leq0.5$), and the ytterbia-stabilized zirconia containing ytterbia in a content of 8 wt % or more and 27 wt % or less.

According to a second aspect of the present invention, there is provided a coating material including a zirconia-dispersed silicate in which ytterbia-stabilized zirconia is precipitated as a dispersed phase in a matrix phase which is any one of a rare earth disilicate, a rare earth monosilicate, and a mixed phase of the rare earth disilicate and the rare earth monosilicate, wherein the rare earth disilicate is any one of a $(Y_{1-a}[Ln_1]_a)_2Si_2O_7$ solid solution (here, $Ln_1$ is any one of Sc, Yb, and Lu, a is 0.05 or more and less than 1 when $Ln_1$ is Sc, and a is 0.2 or more and less than 1 when $Ln_1$ is Yb or Lu), $Sc_2Si_2O_7$, $Yb_2Si_2O_7$, and $Lu_2Si_2O_7$, the rare earth monosilicate is $Y_2SiO_5$, $[Ln_1']_2SiO_5$, or a $(Y_{1-b}[Ln_1']_b)_2SiO_5$ solid solution (here, $Ln_1'$ is any one of Sc, Yb, and Lu, and $0<b\leq0.5$), and the ytterbia-stabilized zirconia contains ytterbia in a content of 8 wt % or more and 27 wt % or less.

According to a third aspect of the present invention, there is provided a coated member including: a heat-shielding coating layer on a substrate made of a silicon-based ceramic or a ceramic fiber-reinforced ceramic matrix composite, wherein the heat-shielding coating layer is a layer made of a zirconia-dispersed silicate in which ytterbia-stabilized zirconia is precipitated as a dispersed phase in a matrix phase which is any one of a rare earth disilicate, a rare earth monosilicate, and a mixed phase of the rare earth disilicate and the rare earth monosilicate, the rare earth disilicate being any one of a $(Y_{1-c}[Ln_2]_c)_2Si_2O_7$ solid solution (here, $Ln_2$ is any one of Nd, Sm, Eu, and Gd, c is 0.1 or more and less than 1 when $Ln_2$ is Nd, Sm, or Eu, and c is 0.2 or more and less than 1 when $Ln_2$ is Gd), $Nd_2Si_2O_7$, $Sm_2Si_2O_7$, $Eu_2Si_2O_7$, and $Gd_2Si_2O_7$, the rare earth monosilicate being $Y_2SiO_5$ or a $(Y_{1-d}[Ln_2']_d)_2SiO_5$ solid solution (here, $Ln_2'$ is any one of Nd, Sm, Eu, and Gd, and $0<d\leq0.5$), and the ytterbia-stabilized zirconia containing ytterbia in a content of 8 wt % or more and 27 wt % or less.

According to a fourth aspect of the present invention, there is provided a coating material including a zirconia-dispersed silicate in which ytterbia-stabilized zirconia is precipitated as a dispersed phase in a matrix phase which is any one of a rare earth disilicate, a rare earth monosilicate, and a mixed phase of the rare earth disilicate and the rare earth monosilicate, wherein the rare earth disilicate is any one of a $(Y_{1-c}[Ln_2]_c)_2Si_2O_7$ solid solution (here, $Ln_2$ is any one of Nd, Sm, Eu, and Gd, c is 0.1 or more and less than 1 when $Ln_2$ is Nd, Sm, or Eu, and c is 0.2 or more and less than 1 when $Ln_2$ is Gd), $Nd_2Si_2O_7$, $Sm_2Si_2O_7$, $Eu_2Si_2O_7$, and $Gd_2Si_2O_7$, the rare earth monosilicate is $Y_2SiO_5$, $[Ln_2']_2SiO_5$, or a $(Y_{1-d}[Ln_2']_d)_2SiO_5$ solid solution (here, $Ln_2'$ is any one of Nd, Sm, Eu, and Gd, and $0<d\leq0.5$), and the ytterbia-stabilized zirconia contains ytterbia in a content of 8 wt % or more and 27 wt % or less.

In the first and third aspect, it is preferable that a difference in thermal expansion coefficient between the substrate and the heat-shielding coating layer is less than $3\times10^{-6}/K$.

Thermal expansion coefficients of a rare earth disilicate and a rare earth monosilicate are smaller than that of ytterbia-stabilized zirconia. Therefore, a difference in thermal expansion coefficient between a substrate and a heat-shielding coating layer is decreased and thermal stress can be sufficiently alleviated by using a mixed phase of the rare earth silicates and ytterbia-stabilized zirconia in the heat-shielding coating layer, thereby making it possible to prevent the heat-shielding coating layer from being delaminated. Particularly, damage of the heat-shielding coating layer can be reliably prevented by changing a mixing ratio of respective components so that the difference in thermal expansion coefficient between the substrate and the heat-shielding coating layer is less than $3\times10^{-6}/K$.

In general, a thermal expansion coefficient of the rare earth disilicate is smaller than those of the ytterbia-stabilized zirconia and the rare earth monosilicate, and is close to that of a silicon-based ceramic or a ceramic fiber-reinforced ceramic matrix composite used in the substrate. Therefore, in the case of applying the rare earth disilicate alone, or a mixed phase of the rare earth disilicate and the rare earth monosilicate to a matrix phase, an effect of alleviating thermal stress to prevent delamination damage can be improved.

Since a stable region of a β phase is expanded by partially substituting Y in $Y_2Si_2O_7$ with Sc, Yb, or Lu at the ratio, phase transformation does not occur even at a high temperature of about 1300° C. to 1400° C. Phase stability in a high-temperature use environment can be secured by using a rare earth disilicate, which is any one of a $(Y_{1-a}[Ln_1]_a)_2Si_2O_7$ solid solution (here, $Ln_1$ is any one of Sc, Yb, and Lu, a is 0.05 or more and less than 1 when $Ln_1$ is Sc, and a is 0.2 or more and less than 1 when $Ln_1$ is Yb or Lu), $Sc_2Si_2O_7$, $Yb_2Si_2O_7$, and $Lu_2Si_2O_7$, in the matrix phase.

Since a stable region of an α phase is expanded by partially substituting Y in $Y_2Si_2O_7$ with Nd, Sm, Eu, or Gd at the ratio, phase transformation does not occur at a high temperature. Phase stability in a high-temperature use environment can be secured by using a rare earth disilicate, which is any one of a $(Y_{1-c}[Ln_2]_c)_2Si_2O_7$ solid solution (here, $Ln_2$ is any one of Nd, Sm, Eu, and Gd, c is 0.1 or more and less than 1 when $Ln_2$ is Nd, Sm, or Eu, and c is 0.2 or more and less than 1 when $Ln_2$ is Gd), $Nd_2Si_2O_7$, $Sm_2Si_2O_7$, $Eu_2Si_2O_7$, and $Gd_2Si_2O_7$, in the matrix phase.

Since the rare earth monosilicate has good steam resistance, steam resistance of the heat-shielding coating layer can be improved by applying the rare earth monosilicate alone or a mixed phase of the rare earth disilicate and the rare earth monosilicate to a matrix phase.

In the present invention, since ytterbia-stabilized zirconia is used as a dispersed phase, even in the case of using the coated member at a high temperature of about 1300° C. to 1400° C. for a long period of time, phase transformation does not occur, and it is possible to prevent the heat-shielding coating layer from being damaged. The heat-shielding coating layer includes the ytterbia-stabilized zirconia, erosion resistance of the heat-shielding coating layer can be improved.

According to a fifth aspect of the present invention, there is provided a method of manufacturing a coated member, the method including: forming a heat-shielding coating layer on a substrate by spraying particles onto a substrate made of a silicon-based ceramic or a ceramic fiber-reinforced ceramic matrix composite, the particles being obtained by mixing any one of rare earth disilicate powder, rare earth monosilicate powder and mixed powder of the rare earth disilicate powder and the rare earth monosilicate powder with ytterbia-stabilized zirconia powder containing ytterbia in a content of 8 wt % or more and 27 wt % or less and heat-treating the obtained mixed powder at a temperature of 1300° C. or more and 1700° C. or less, wherein the rare earth disilicate powder is made of any one of a $(Y_{1-a}[Ln_1]_a)_2Si_2O_7$ solid solution (here, $Ln_1$ is any one of Sc, Yb, and Lu, a is 0.05 or more and less than 1 when $Ln_1$ is Sc, and a is 0.2 or more and less than 1 when $Ln_1$ is Yb or Lu), $Sc_2Si_2O_7$, $Yb_2Si_2O_7$, and $Lu_2Si_2O_7$, and the rare earth monosilicate powder is made of any one of $Y_2SiO_5$,$[Ln_1']_2SiO_5$, and a $(Y_{1-b}[Ln_1']_b)_2SiO_5$ solid solution (here, $Ln_1'$ is any one of Sc, Yb, and Lu, and $0<b\le0.5$).

According to a sixth aspect of the present invention, there is provided a method of manufacturing a coated member, the method including: forming a heat-shielding coating layer on a substrate by spraying particles onto a substrate made of a silicon-based ceramic or a ceramic fiber-reinforced ceramic matrix composite, the particles being obtained by mixing any one of rare earth disilicate powder, rare earth monosilicate powder and mixed powder of the rare earth disilicate powder and the rare earth monosilicate powder with ytterbia-stabilized zirconia powder containing ytterbia in a content of 8 wt % or more and 27 wt % or less and heat-treating the obtained mixed powder at a temperature of 1300° C. or more and 1700° C. or less, wherein the rare earth disilicate powder is made of any one of a $(Y_{1-c}[Ln_2]_c)_2Si_2O_7$ solid solution (here, $Ln_2$ is any one of Nd, Sm, Eu, and Gd, c is 0.1 or more and less than 1 when $Ln_2$ is Nd, Sm, or Eu, and c is 0.2 or more and less than 1 when $Ln_2$ is Gd), $Nd_2Si_2O_7$, $Sm_2Si_2O_7$, $Eu_2Si_2O_7$, and $Gd_2Si_2O_7$, and the rare earth monosilicate powder is made of any one of $Y_2SiO_5$ and a $(Y_{1-d}[Ln_2']_d)_2SiO_5$ solid solution (here, $Ln_2'$ is any one of Nd, Sm, Eu, and Gd, and $0<d\le0.5$).

In the present aspect, since zirconia-dispersed silicate particles having the above-mentioned composition are prepared in advance, and these particles are used as spray particles, a heat-shielding coating layer having a uniform composition can be formed.

In fifth and sixth aspects, it is preferable that rare earth disilicate powder, rare earth monosilicate powder, or mixed powder thereof is mixed with ytterbia-stabilized zirconia powder at a ratio at which the difference in thermal expansion coefficient between the substrate and the heat-shielding coating layer is less than $3\times10^{-6}$/K.

In this way, damage of the formed heat-shielding coating layer can be reliably prevented.

In the first, third, fifth, and sixth aspect, it is preferable that the substrate is made of an oxide-based ceramic fiber-reinforced oxide-based ceramic matrix composite or a SiC fiber-reinforced SiC matrix composite. In this case, it is preferable that the oxide-based ceramic fiber-reinforced oxide-based ceramic matrix composite is an $Al_2O_3$ fiber-reinforced $Al_2O_3$ matrix composite.

These ceramic fiber-reinforced ceramic matrix composites are lightweight and have excellent mechanical stability at a high temperature. Particularly, since an $Al_2O_3$ fiber-reinforced $Al_2O_3$ matrix composite is cheaper than a SiC fiber-reinforced SiC matrix composite, the $Al_2O_3$ fiber-reinforced $Al_2O_3$ matrix composite is advantageous in that manufacturing cost can be decreased.

In the first to sixth aspects it is preferable that an addition amount of the ytterbia-stabilized zirconia in the zirconia-dispersed silicate particles is 50 vol % or more and 90 vol % or less.

In order to secure a heat-shielding property, it is preferable that an addition amount of the ytterbia-stabilized zirconia is large. Meanwhile, as described above, since the ytterbia-stabilized zirconia has a high thermal expansion coefficient, a thermal expansion coefficient of zirconia-dispersed silicate is increased when the addition amount thereof is large.

Since a difference in thermal expansion coefficient between a heat-shielding coating layer made of the zirconia-dispersed silicate in the above-mentioned addition amount range and a substrate made of the silicon-based ceramic or ceramic fiber-reinforced ceramic matrix composite is small, it is possible to suppress the heat-shielding coating layer from being damaged.

Advantageous Effects of Invention

According to the present invention, a heat-shielding coating layer, in which heat-shielding properties and erosion resistance are excellent and thermal stress is suppressed, can be obtained. In the case in which a matrix phase of zirconia-dispersed silicate includes a rare earth monosilicate, steam resistance of the heat-shielding coating layer can be further improved.

DESCRIPTION OF EMBODIMENTS

First Embodiment

Figure 1:
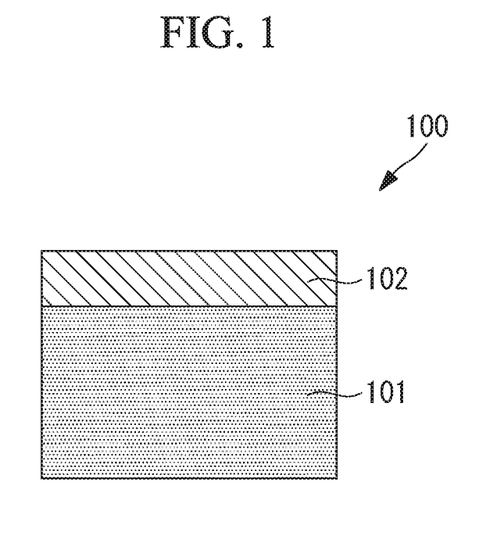
FIG. 1 is a schematic cross-sectional view of a coated member according to a first embodiment.

FIG. 1 is a schematic cross-sectional view of a coated member according to a first embodiment. A coated member 100 includes a heat-shielding coating layer 102 on a substrate 101.

The substrate 101 is a turbine member of an aircraft engine or a gas turbine member for powder generation such as a shroud, a combustion liner, or the like. In detail, the substrate 101 is made of a silicon (Si)-based ceramic or a ceramic fiber-reinforced ceramic matrix composite. The silicon-based ceramic means a ceramic containing silicon such as SiC, $Si_3N_4$, or the like. The ceramic fiber-reinforced ceramic matrix composite is an oxide-based ceramic fiber-reinforced oxide-based ceramic matrix composite exemplified by a SiC fiber-reinforced SiC matrix composite or an $Al_2O_3$ fiber-reinforced $Al_2O_3$ matrix composite.

In the present embodiment, the heat-shielding coating layer 102 is a layer made of a zirconia-dispersed silicate in which ytterbia-stabilized zirconia (YbSZ) is precipitated as a dispersed phase in a matrix phase which is any one of a rare earth disilicate, a rare earth monosilicate, and a mixed phase of the rare earth disilicate and the rare earth monosilicate. A thickness of the heat-shielding coating layer 102 is 50 μm or more and 500 μm or less.

In the present embodiment, YbSZ is zirconia ($ZrO_2$) to which ytterbia ($Yb_2O_3$) is added as a stabilizer in a content of 8 wt % or more and 27 wt % or less. YbSZ has excellent high-temperature stability at a high temperature (for example, about 1300° C. to 1400° C.) and imparts erosion resistance to the heat-shielding coating layer 102. When an addition amount of ytterbia is less than 8 wt %, phase stability is deteriorated. When the addition amount of ytterbia is more than 27 wt %, mechanical properties are deteriorated.

The rare earth disilicate is any one of a $(Y_{1-a}[Ln_1]_a)_2Si_2O_7$ solid solution (here, $Ln_1$ is at least one of Sc, Yb, and Lu, a is 0.05 or more and less than 1 when $Ln_1$ is Sc, and a is 0.2 or more and less than 1 when $Ln_1$ is Yb or Lu), $Sc_2Si_2O_7$, $Yb_2Si_2O_7$, and $Lu_2Si_2O_7$.

Alternatively, the rare earth disilicate is any one of a $(Y_{1-c}[Ln_2]_c)_2Si_2O_7$ solid solution (here, $Ln_2$ is at least one of Nd, Sm, Eu, and Gd, c is 0.1 or more and less than 1 when $Ln_2$ is Nd, Sm, or Eu, and c is 0.2 or more and less than 1 when $Ln_2$ is Gd), $Nd_2Si_2O_7$, $Sm_2Si_2O_7$, $Eu_2Si_2O_7$, and $Gd_2Si_2O_7$.

Figure 2:
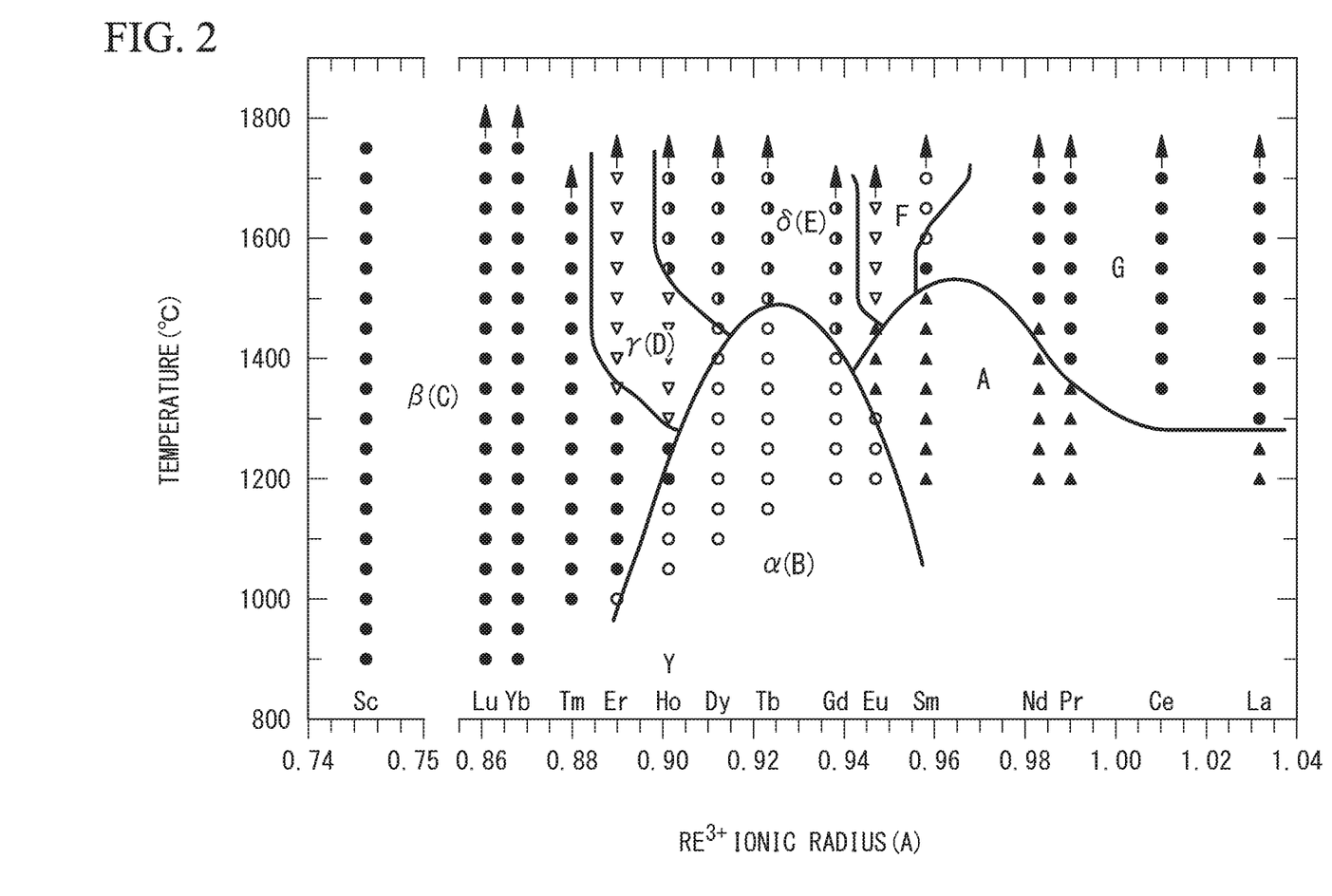
FIG. 2 is a graph illustrating a relationship between a temperature and a crystal structure of a rare earth disilicate.

FIG. 2 is a graph illustrating a relationship between a temperature and a crystal structure of a rare earth disilicate (Reference of the graph: A. J. F. Carrion et al., "Structural and Kinetic Study of Phase Transitions in $LaYSi_2O_7$", Journal of the European Ceramic Society, Vol. 32 (2012) PP. 2477-2486, A boundary line of the crystal structure is added by the present inventor). In FIG. 2, a horizontal axis indicates an ionic radius of a rare earth element, and a vertical axis indicates a temperature.

An ionic radius of $Y^{3+}$ is 0.90 Å, and referring to FIG. 2, phase transition (γ phase→β phase) occurs at about 1280° C. That is, when the coated member is used in a temperature environment higher than 1300° C., phase transformation accompanied with a volume change is generated by repetitive cooling and heating.

Referring to FIG. 2, an ionic radius on a boundary line between the β phase and the γ phase at 1300° C. is 0.897 Å. That is, when the ionic radius of the rare earth element is 0.897 Å or less, crystal stability of the rare earth disilicate can be secured up to 1300° C. An ionic radius on a boundary line between the β phase and the γ phase at 1400° C. is 0.885 Å. That is, when the ionic radius of the rare earth element is 0.885 Å or less, crystal stability of the rare earth disilicate can be secured up to 1400° C.

In the $(Y_{1-a}[Ln_1]_a)_2Si_2O_7$ solid solution in which Y is substituted with a separate rare earth element, an average ionic radius of rare earth elements (Y and $Ln_1$) is changed depending on a substitution amount. In order to allow the average ionic radius to be smaller than that of Y, Y is substituted with a rare earth element having an ionic radius smaller than that of Y. Referring to FIG. 2, the elements having an ionic radius smaller than that of Y are Sc, Yb, Lu, Tm, and Er. Particularly, in the cases of Sc, Yb, and Lu, the ionic radius is small as compared to Y, and a β phase of disilicate is stably present up to a high temperature.

Table 1 illustrates a substitution amount of a substitution element (Sc, Yb, or Lu) in the $(Y_{1-a}[Ln_1]_a)_2Si_2O_7$ solid solution and an average ionic radius of the rare earth elements.

TABLE 1

| | Substitution Element | | |
| --- | --- | --- | --- |
| a | Sc | Yb | Lu |
| 0 | 0.9 | 0.9 | 0.9 |
| 0.05 | 0.892 | 0.898 | 0.898 |
| 0.1 | 0.885 | 0.897 | 0.897 |
| 0.2 | 0.869 | 0.894 | 0.894 |
| 0.3 | 0.854 | 0.89 | 0.89 |
| 0.4 | 0.838 | 0.887 | 0.887 |
| 0.5 | 0.823 | 0.884 | 0.884 |

Referring to Table 1, the average ionic radius is to be 0.897 Å or less if a is 0.05 or more for Sc, and 0.1 or more for Yb or Lu. That is, when a is equal to or higher than the above-mentioned range, the coated member can withstand an operation temperature of 1300° C.

Further, referring to Table 1, the average ionic radius is to be 0.885 Å or less if a is 0.1 or more for Sc, and 0.5 or more for Yb or Lu. That is, when a is equal to or higher than the above-mentioned range, the coated member can withstand an operation temperature of 1400° C. or more.

In the case in which a rare earth element has a larger ionic radius as that of Y, there is a boundary between an α phase and a γ phase as illustrated in FIG. 2. Referring to FIG. 2, an ionic radius on a boundary line between the α phase and the γ phase at 1300° C. is 0.905 Å. That is, when the ionic radius of the rare earth element is 0.905 Å or more, crystal stability of the rare earth disilicate can be secured up to 1300° C. An ionic radius on a boundary line between the α phase and the γ phase at 1400° C. is 0.91 Å. That is, when the ionic radius of the rare earth element is 0.91 Å or more, crystal stability of the rare earth disilicate can be secured up to 1400° C.

In order to allow the average ionic radius to be larger than that of Y, Y is substituted with a rare earth element having an ionic radius larger than that of Y. As a difference in ionic radius between a rare earth element and Y is increased, an effect of changing an average ionic radius of the rare earth elements is increased. Therefore, it is advantageous to select an element having an ionic radius larger than that of Gd in FIG. 2. Meanwhile, Pr, Ce, and La have high reactivity with steam, such that steam resistance of the coating film is deteriorated. Therefore, Gd, Eu, Sm, and Nd are suitable as a substitution element of Y.

Table 2 illustrates a substitution amount of a substitution element (Gd, Eu, Sm, or Nd) in $(Y_{1-c}[Ln_2]_c)_2Si_2O_7$ and an average ionic radius of the rare earth elements.

TABLE 2

| | Substitution Element | | | |
|---|---|---|---|---|
| c | Nd | Sm | Eu | Gd |
| 0 | 0.9 | 0.9 | 0.9 | 0.9 |
| 0.1 | 0.908 | 0.906 | 0.905 | 0.9038 |
| 0.2 | 0.917 | 0.912 | 0.909 | 0.9076 |
| 0.3 | 0.925 | 0.917 | 0.914 | 0.9114 |
| 0.4 | 0.933 | 0.923 | 0.919 | 0.9152 |
| 0.5 | 0.942 | 0.929 | 0.924 | 0.919 |

Referring to Table 2, the average ionic radius is to be 0.905 Å or more if c is 0.1 or more for Nd, Sm, or Eu, and 0.2 or more for Cd. That is, when c is equal to or higher than the above-mentioned range, the coated member can withstand an operation temperature up to 1300° C.

Further, referring to Table 2, the average ionic radius is to be 0.91 Å or more if c is 0.2 or more for Nd or Sm, and 0.3 or more for Eu or Gd. That is, when c is equal to or higher than the above-mentioned range, the coated member can withstand an operation temperature up to 1400° C.

In the case in which the rare earth disilicate is $(Y_{1-a}[Ln_1]_a)_2Si_2O_7$ (here, $Ln_1$ is at least one of Sc, Yb, and Lu), the rare earth monosilicate is $Y_2SiO_5$, $[Ln_1']_2SiO_5$, or a $(Y_{1-b}[Ln_1']_b)_2SiO_5$ solid solution (here, $Ln_1'$ is any one of Sc, Yb, and Lu, and $0<b\leq0.5$).

In the case in which the rare earth disilicate is $(Y_{1-c}[Ln_2]_c)_2Si_2O_7$ (here, $Ln_2$ is at least one of Nd, Sm, Eu, and Gd), the rare earth monosilicate is $Y_2SiO_5$ or a $(Y_{1-d}[Ln_2']_d)_2SiO_5$ solid solution (here, $Ln_2'$ is any one of Nd, Sm, Eu, and Gd, and $0<d\leq0.5$).

Since the rare earth monosilicate has a low activity of $SiO_2$ as compared to the rare earth disilicate, the rare earth monosilicate has high steam resistance. Among the rare earth monosilicates, $Y_2SiO_5$ is cheap. $Sc_2SiO_5$, $Yb_2SiO_5$, $Lu_2SiO_5$, $Nd_2SiO_5$, $Sm_2SiO_5$, $Eu_2SiO_5$, and $Gd_2SiO_5$ have almost similar properties to those of $Y_2SiO_5$. Therefore, as the rare earth monosilicate, one of these compounds may be used alone or Y in $Y_2SiO_5$ can be substituted with at least one of Sc, Yb, and Lu, or at least one of Nd, Sm, Eu, and Gd.

As the rare earth monosilicate, $Y_2SiO_5$ (substitution amounts b=0, and d=0) can be used, but in order to prevent concentrations of the rare earth elements from being changed by interdiffusion with the rare earth disilicate, $(Y_{1-a}Ln_{1a})_2Si_2O_7$ and $(Y_{1-c}[Ln_2]_c)_2Si_2O_7$, coexisting in the mixed phase, it is preferable that the substitution amounts b and d are the same as the substitution amounts a and c of the rare earth disilicate. When the substitution amounts b and d are large, cost is increased, such that upper limits of b and d are 0.5.

In a coated member 100 corresponding to a laminate, when a difference in thermal expansion coefficient between the substrate 101 and the heat-shielding coating layer 102 is large, thermal stress is generated in the heat-shielding coating layer 102. Cracks, or the like, occur in the heat-shielding coating layer 102 due to thermal stress generated in the heat-shielding coating layer 102 by repeating operation and stop of equipment (aircraft engine or gas turbine). In order to alleviate thermal stress generated in the heat-shielding coating layer 102, a difference between the thermal expansion coefficient of the heat-shielding coating layer 102 and the thermal expansion coefficient of the substrate 101 needs to be less than $3\times10^{-6}$/K, and preferably, less than $2\times10^{-6}$/K (at room temperature to 1200° C.)

A thermal expansion coefficient of a mixture is changed depending on a mixing ratio of each component. In order to allow the difference in thermal expansion coefficient to be above-mentioned range, a mixing ratio between the rare earth silicates and YbSZ, the kinds of rare earth disilicate and rare earth monosilicate, a substitution amount of the rare earth element, and a mixing ratio between the rare earth monosilicate and the rare earth disilicate in the case in which the mixed phase of the rare earth monosilicate and the rare earth disilicate is used as the matrix phase are determined depending on the kind of substrate 101.

For example, the thermal expansion coefficient of the substrate 101 is $6\times10^{-6}$/K to $8\times10^{-6}$/K (at room temperature to 1200° C.) if the substrate 101 is made of the $Al_2O_3$ fiber-reinforced $Al_2O_3$ matrix composite, the thermal expansion coefficient of the substrate 101 is $3.5\times10^{-6}$/K to $4.5\times10^{-6}$/K if the substrate 101 is made of the SiC fiber-reinforced SiC matrix composite, the thermal expansion coefficient of the substrate 101 is $4.5\times10^{-6}$/K if the substrate is made of SiC, and the thermal expansion coefficient of the substrate 101 is $3.3\times10^{-6}$/K if the substrate is made of $Si_3N_4$.

A thermal expansion coefficient of YbSZ (8 to 27 wt % $Yb_2O_3$—$ZrO_2$) is $10.3\times10^{-6}$/K (at room temperature to 1200° C.). The thermal expansion coefficient of the rare earth monosilicate is $7.1\times10^{-6}$/K to $10.1\times10^{-6}$/K (for example, a thermal expansion coefficient of $Y_2SiO_5$ is $7.4\times10^{-6}$/K) (at room temperature to 1200° C.), and the thermal expansion coefficient of the rare earth disilicate is $3.7\times10^{-6}$/K to $4.2\times10^{-6}$/K (for example, a thermal expansion coefficient of $Y_2Si_2O_7$ is $3.7\times10^{-6}$/K) (at room temperature to 1200° C.)

YbSZ has a large thermal expansion coefficient as compared to the substrate. In the case in which an addition amount of YbSZ is large, thermal stress is generated in the heat-shielding coating layer 102. Meanwhile, in the case in which the addition amount of YbSZ is small, sufficient erosion resistance cannot be obtained. Therefore, it is preferable that the addition amount of YbSZ is 50 vol % or more and 90 vol % or less.

In the case in which the substrate 101 is made of the $Al_2O_3$ fiber-reinforced $Al_2O_3$ matrix composite, even though the matrix phase is made of the rare earth monosilicate, a difference in thermal expansion coefficient between the substrate 101 and the heat-shielding coating layer 102 is small, thereby suppressing thermal stress in the heat-shielding coating layer 102. This combination is advantageous in that a heat-shielding coating layer 102 having excellent steam resistance can be obtained.

Meanwhile, in the case in which the substrate 101 is made of a material of which a thermal expansion coefficient is significantly different from that of YbSZ, such as the SiC fiber-reinforced SiC matrix composite or the silicon-based ceramic, thermal stress in the heat-shielding coating layer 102 can be suppressed by selecting the rare earth disilicate, which is a material having a small thermal expansion coefficient, as a matrix phase. Further, in the case of using the mixed phase of the rare earth disilicate and the rare earth monosilicate as the matrix phase, it is possible to impart excellent steam resistance to the heat-shielding coating layer 102 while decreasing the thermal expansion coefficient of the heat-shielding coating layer 102.

The heat-shielding coating layer 102 according to the present embodiment is formed by a spray method. Spray particles are prepared by the method described below.

The rare earth disilicate and the rare earth monosilicate corresponding to the matrix phase are prepared by the method described below.

As raw material powder of the rare earth disilicate, $SiO_2$ powder, $Y_2O_3$ powder, $[Ln_1]_2O_3$ (here, $Ln_1$ is any one of Sc, Yb, and Lu), and $[Ln_2]_2O_3$ powder (here, $Ln_2$ is any one of Nd, Sm, Eu, and Gd) are weighed and mixed with each other so as to have a predetermined composition.

As raw material powder of the rare earth monosilicate, $SiO_2$ powder, $Y_2O_3$ powder, $[Ln_1']_2O_3$ (here, $Ln_1'$ is any one of Sc, Yb, and Lu), and $[Ln_2']_2O_3$ powder (here, $Ln_2'$ is any one of Nd, Sm, Eu, and Gd) are weighed and mixed with each other so as to have a predetermined composition.

The mixed powder is heat-treated, thereby obtaining rare earth disilicate powder and rare earth monosilicate powder. As a method of performing heat-treatment, there is a method of performing heat-treatment at 1300° C. or more using an electric furnace, a method of performing plasma heat-treatment, a method of melting the raw material powder and grinding the obtained melt, or the like.

Since a reaction by heat-treatment can be promoted by using fine powder having a particle size of 1 μm or less as the raw material powder, it is possible to decrease a heat-treatment time while removing un-reacted particles.

The powder after heat-treatment was pulverized and classified into 1 μm to 50 μm or so.

Alternatively, commercial $Y_2Si_2O_7$ powder, $[Ln_1]_2Si_2O_7$ powder, $[Ln_2]_2Si_2O_7$ powder, $[Ln_1']_2SiO_5$ powder, and $[Ln_2']_2SiO_5$ powder may be used as the raw material powder.

In the case in which the mixed powder of the rare earth disilicate powder and the rare earth monosilicate powder is used as the matrix phase, the rare earth disilicate powder and the rare earth monosilicate powder prepared as described above are weighed and mixed with each other to have a predetermined composition ratio.

In order to obtain YbSZ, $ZrO_2$ powder and $Yb_2O_3$ powder in a predetermined ratio (8 wt % or more and 27 wt % or less) are mixed together with a suitable binder and a suitable dispersant in a ball mill, thereby preparing slurry. This slurry is granulated and dried by a spray drier, and subjected to diffusion heat-treatment at 1300° C. to 1700° C. so that $Yb_2O_3$ and $ZrO_2$ are solid-solubilized, thereby obtaining YbSZ powder.

The YbSZ powder after heat-treatment was pulverized and classified into 1 μm to 50 μm or so.

The rare earth disilicate powder, the rare earth monosilicate powder, or a mixed powder of the rare earth disilicate powder and the rare earth monosilicate powder is mixed with the YbSZ powder at a predetermined ratio.

Zirconia-dispersed silicate powder is obtained by performing heat-treatment on the mixed powder. As a method of performing heat-treatment, there is a method of performing heat-treatment at 100° C. or more using an electric furnace, a method of performing plasma heat-treatment, a method of melting the raw material powder and grinding the obtained melt, or the like.

The mixed powder is prepared by using fine powder having a particle size of 1 μm or less, such that a reaction by heat-treatment can be promoted, and it is possible to decrease a heat-treatment time while removing un-reacted particles.

The particles after heat-treatment are pulverized and classified, and particles having a size of 10 μm to 200 μm are used for spraying as a coating material.

In order to verify phase stability of the rare earth disilicate, spray powder of $Y_2Si_2O_7$, a $(Y_{0.8}Yb_{0.2})_2Si_2O_7$ solid solution, and a $(Y_{0.8}Gd_{0.2})_2Si_2O_7$ solid solution were prepared by the method as described above. Further, spray coating films were manufactured using these powder.

Figure 3:
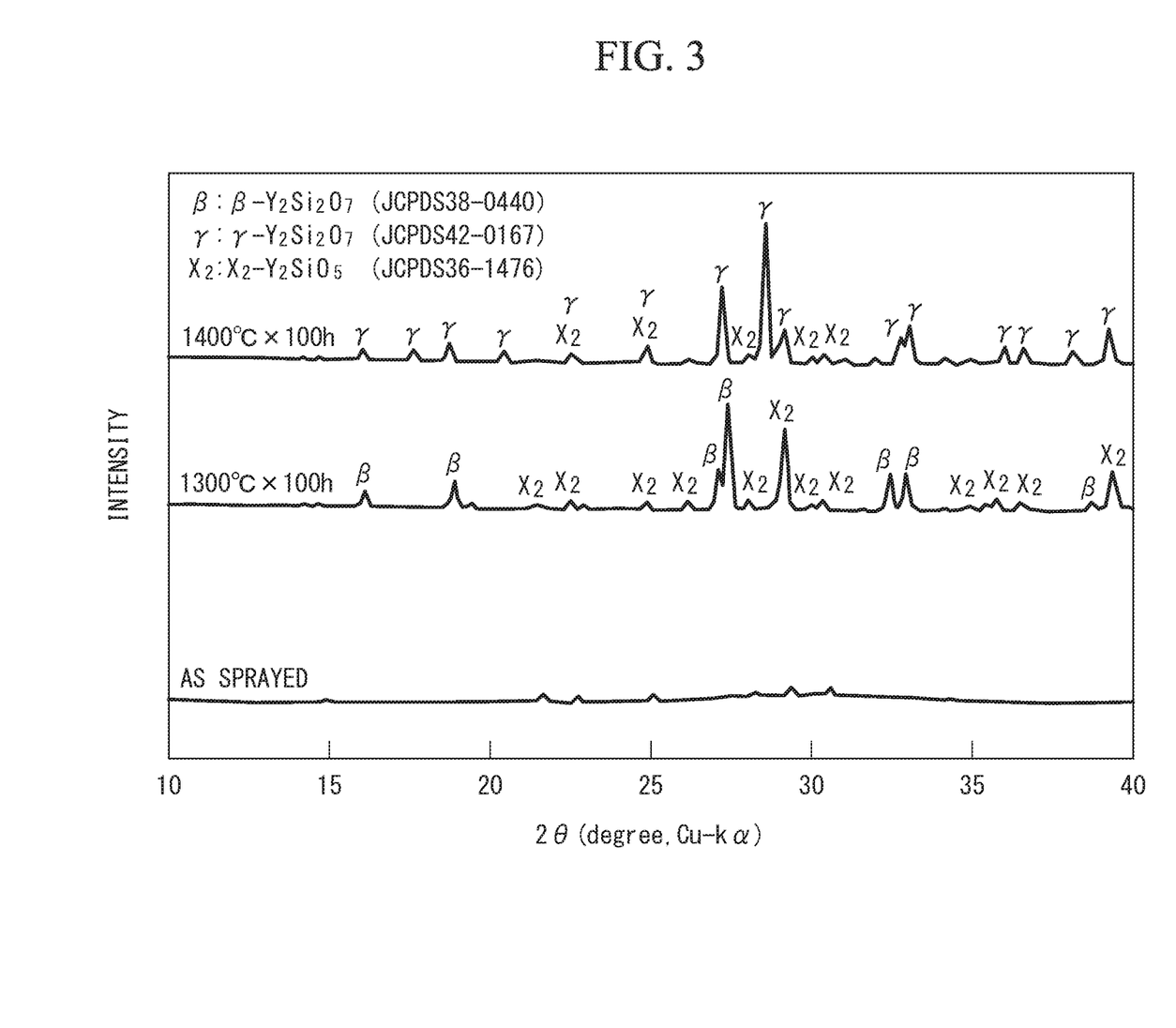
FIG. 3 is a view illustrating a change in crystal structure by heat-treatment of a $Y_2Si_2O_7$ spray coating film.

The manufactured spray coating film was heat-treated at 1300° C. for 100 hours and 1400° C. for 100 hours, and a change in crystal phase was determined by X-ray diffraction (XRD). As illustrated in FIG. 3, in the case of $Y_2Si_2O_7$, a coating film was amorphous in the as-sprayed state, and after heat-treatment at 1300° C. for 100 hours, the coating film was composed of a $\beta$-$Y_2Si_2O_7$ phase and an $X_2$—$Y_2SiO_5$ phase. After heat-treatment at 1400° C. for 100 hours, the coating film was composed of two phases, that is, a $\gamma$-$Y_2Si_2O_7$ phase and the $X_2$—$Y_2SiO_5$ phase. Therefore, it may be appreciated that at 1300° C. or more, phase transformation from $\beta$-$Y_2Si_2O_7$ to $\gamma$-$Y_2Si_2O_7$ occurred.

Figure 4:
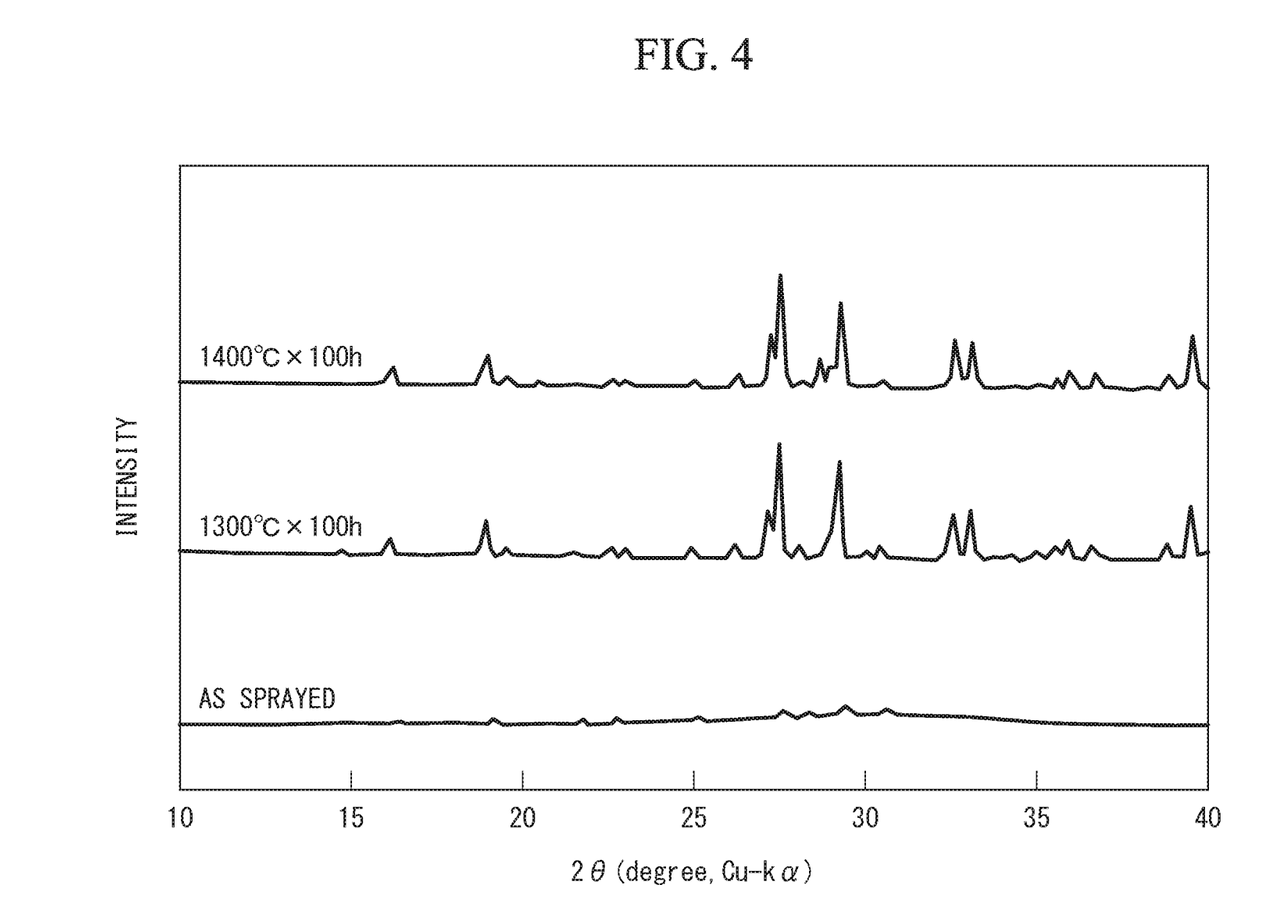
FIG. 4 is view illustrating a change in crystal structure by heat-treatment of a $(Y_{0.8}Yb_{0.2})_2Si_2O_7$ solid solution spray coating film.

Meanwhile, FIG. 4 illustrates the results obtained by heat-treating a $(Y_{0.8}Yb_{0.2})_2Si_2O_7$ solid solution spray coating film in which Y was partially substituted with Yb at 1300° C. for 100 hours and at 1400° C. for 100 hours. It may be appreciated that in the cases of heat-treatment at 1300° C. for 100 hours and at 1400° C. for 100 hours, there was almost no change in a diffraction peak, and thus, phase transformation was suppressed.

Figure 5:
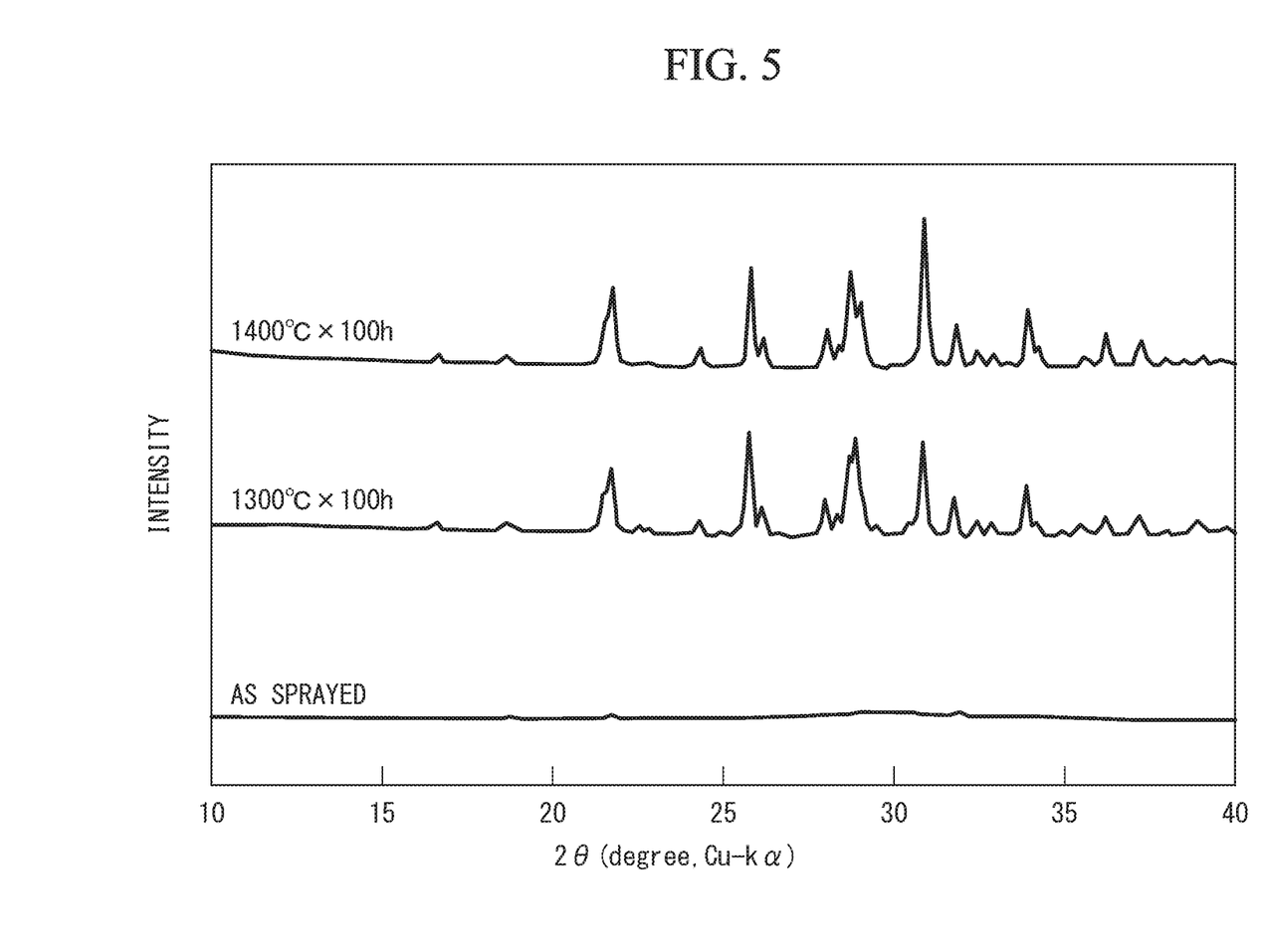
FIG. 5 is view illustrating a change in crystal structure by heat-treatment of a $(Y_{0.8}Gd_{0.2})_2Si_2O_7$ solid solution spray coating film.

Meanwhile, FIG. 5 illustrates the results obtained by heat-treating a $(Y_{0.8}Gd_{0.2})_2Si_2O_7$ solid solution spray coating film in which Y was partially substituted with Gd at 1300° C. for 100 hours and at 1400° C. for 100 hours. It may be appreciated that in the cases of heat-treatment at 1300° C. for 100 hours and at 1400° C. for 100 hours, there was almost no change in a diffraction peak, and thus, phase transformation was suppressed.

Second Embodiment

Figure 6:
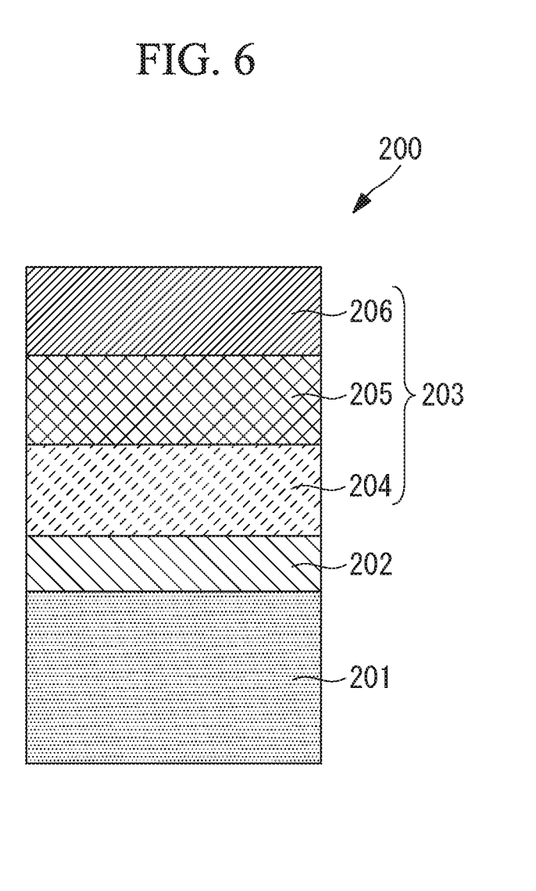
FIG. 6 is a schematic cross-sectional view of a coated member according to a second embodiment.

FIG. 6 is a schematic cross-sectional view of a coated member according to a second embodiment. In a coated member 200, a bond coat 202 and a top coat 203 are sequentially laminated on a substrate 201. The top coat 203 is composed of three layers. An outermost layer of the top coat 203 is a heat-shielding coating layer 206.

The substrate 201 is made of the same material as in the first embodiment.

The bond coat 202 is to secure good adhesion between the substrate 201 and the top coat 203. The bond coat 202 is made of Si, silicide such as $MoSi_2$, LuSi, or the like, mullite ($3Al_2O_3$-$2SiO_2$), barium strontium aluminosilicate (BSAS, $(Ba_{1-x}Sr_x)O$—$Al_2O_3$—$SiO_2$), or the like. The bond coat 202 may be made of one of the above-mentioned materials or formed by laminating a plurality of materials. The bond coat 202 has a thickness of 20 μm or more and 200 μm or less.

The bond coat 202 is formed by a spray method, a sintering method, or the like.

A first layer 204 of the top coat is composed of a mixed phase of a rare earth disilicate and a rare earth monosilicate. A thickness of the first layer 204 is 20 μm or more and 400 μm or less.

In detail, the first layer 204 is composed of a mixed phase of a rare earth disilicate represented by a $(Y_{1-e}[Ln_3]_e)_2Si_2O_7$ solid solution (here, $Ln_3$ is any one of Sc, Yb, and Lu, e is 0.05 or more and 0.5 or less when $Ln_3$ is Sc, and e is 0.2 or more and 0.5 or less when $Ln_3$ is Yb or Lu), and a rare earth monosilicate represented by a $Y_2SiO_5$ or a $(Y_{1-f}[Ln_3']_f)_2SiO_5$ solid solution (here, $Ln_3'$ is any one of Sc, Yb, and Lu, and f is more than 0 to 0.5 or less).

Alternatively, the first layer 204 is composed of a mixed phase of a rare earth disilicate represented by a $(Y_{1-g}[Ln_4]_g)_2Si_2O_7$ solid solution (here, $Ln_4$ is any one of Nd, Sm, Eu, and Gd, g is 0.1 or more and 0.5 or less when $Ln_4$ is Nd, Sm, or Eu, and g is 0.2 or more and 0.5 or less when $Ln_4$ is Gd), and a rare earth monosilicate represented by a $Y_2SiO_5$ or a $(Y_{1-h}[Ln_4']_h)_2SiO_5$ solid solution (here, $Ln_4'$ is any one of Nd, Sm, Eu, and Gd, and h is more than 0 to 0.5 or less).

When e and g of the rare earth disilicate in the first layer 204 are within the above-mentioned ranges, the coated member can withstand an operation temperature of 1400° C. or more. If e and g are large, an amount of the substitution element is increased. Therefore, in consideration of raw material cost, cost for substitution is increased by using Sc, Yb, and Lu, or Nd, Sm, Eu, and Gd, which are expensive elements. Therefore, there is an upper limit in the substitution amounts of Sc, Yb, and Lu, or Nd, Sm, Eu, and Gd. In detail, it is preferable that upper limits of e and g are 0.5.

As the rare earth monosilicate, $Y_2SiO_5$ (substitution amount f=0, and h=0) can be used. However, in order to prevent concentrations of rare earth elements from being changed by interdiffusion with the rare earth disilicate, coexisting in the mixed phase, it is preferable that the substitution amounts f and h are the same as substitution amounts e and g of the rare earth disilicate. Meanwhile, when the substitution amounts f and h exceed the above-mentioned ranges, raw material cost is increased, which is not preferable.

In order to alleviate thermal stress in the top coat 203, a difference in thermal expansion coefficient between the first layer 204 and a base (substrate 201 including the bond coat 202) is less than $3 \times 10^{-6}$/K, and preferably, less than $2 \times 10^{-6}$/K (at room temperature to 1200° C.). In order to allow the difference in thermal expansion coefficient to be in the above-mentioned range, a composition of the rare earth disilicate, a composition of the rare earth monosilicate, and a mixing ratio between the rare earth disilicate and the rare earth monosilicate are determined depending on the kinds of substrate 201 and bond coat 202.

The first layer 204 is formed by a spray method. Spray particles for forming the first layer 204 are prepared by the same process as that in the first embodiment described above. That is, rare earth disilicate powder and rare earth monosilicate powder having predetermined compositions are prepared in advance. The rare earth disilicate powder and the rare earth monosilicate powder are mixed with each other at a predetermined ratio and subjected to heat-treatment using the method described in the first embodiment. The powder after heat-treatment are pulverized and classified into 1 μm to 50 μm or so.

A second layer 205 of the top coat 203 is made of a rare earth monosilicate represented by $Re_2SiO_5$. Here, Re may be one of rare earth elements or a plurality of rare earth elements may be selected. In detail, the second layer 205 is made of $Y_2SiO_5$, $Yb_2SiO_5$, $Lu_2SiO_5$, $(Y, Yb)_2SiO_5$, $(Y, Lu)_2SiO_5$, or the like. Considering raw material cost, it is preferable that the second layer 205 is made of $Y_2SiO_5$ or a rare earth monosilicate, $(Y, Re')_2SiO_5$ (here, Re' is another rare earth element except for Y) in which Y is partially substituted with another rare earth element. Considering interdiffusion with the rare earth disilicate, it is preferable that a substitution element Re' is Sc, Yb, Lu, Nd, Sm, Eu, or Gd. It is particularly preferable that the substitution element Re' is the same material as the rare earth element contained in the first layer 204. Considering raw material cost, it is preferable that a substitution amount of Re' is 0.5 or less.

The second layer 205 is formed by a spray method. A thickness of the second layer 205 is 50 μm or more and 300 μm or less.

In the case of applying the composite oxide containing a rare earth element selected from the plurality of rare earth elements to the second layer 205, particles solid-solubilized by heat-treatment after weighing and mixing raw material powder so as to have a predetermined substitution ratio can be used as the spray particles. In this way, uniformity of the composition in the second layer 205 is secured.

A difference in thermal expansion coefficient between the first layer 204 and the second layer 205 is less than $3 \times 10^{-6}$/K, preferably, less than $2 \times 10^{-6}$/K (at room temperature to 1200° C.). A material of the second layer 205 is selected so that the difference in thermal expansion coefficient described above is secured.

The third layer 206 of the top coat 203 is the heat-shielding coating layer, and the same material as that in the first embodiment is used therein. It is possible to prevent the substrate 201 from being eroded by steam in a high-temperature environment by forming the third layer 206 made of YbSZ and rare earth monosilicate which have excellent steam resistance.

Considering thermal stress of the top coat 203 under a use environment, a difference in thermal expansion coefficient between the second layer 205 and the third layer 206 is less than $3 \times 10^{-6}$/K, preferably, less than $2 \times 10^{-6}$/K (at room temperature to 1200° C.). A material of the third layer 206, that is, a composition of a matrix phase, and an addition amount of YbSZ are selected so that the difference in thermal expansion coefficient described above is secured.

Example

Table 3 illustrates a difference in thermal expansion coefficient between a substrate and a heat-shielding coating layer (at room temperature to 1200° C.) in the case of forming a coated member having a configuration illustrated in FIG. 1. As the substrate, an $Al_2O_3$ fiber-reinforced $Al_2O_3$ matrix composite (AS-N610, COI Ceramics, thermal expansion coefficient: $8 \times 10^{-6}$/K (at room temperature to 1200° C.), or AS-N720, COI Ceramics, thermal expansion coefficient: $6.3 \times 10^{-6}$/K (at room temperature to 1200° C.)) was used.

In Table 3, "YbSZ" is stabilized zirconia to which 16 wt % of $Yb_2O_3$ was added.

TABLE 3

| | Example 1 | Example 2 | Example 3 | Example 4 | Example 5 | Comparative Example 1 | Comparative Example 2 |
|---|---|---|---|---|---|---|---|
| Heatshielding Coating Layer | YbSZ + 10 vol % $Yb_2SiO_5$ | YbSZ + 50 vol % $Yb_2SiO_5$ | YbSZ + 25 vol % $Yb_2SiO_5$ + | YbSZ + 25 vol % $Yb_2SiO_5$ + | YbSZ + 25 vol % $(Y_{0.8}Yb_{0.2})_2SiO_5$ + | YbSZ | YbSZ |

TABLE 3-continued

|  | Example 1 | Example 2 | Example 3 | Example 4 | Example 5 | Comparative Example 1 | Comparative Example 2 |
|---|---|---|---|---|---|---|---|
| Substrate | AS-N610 | AS-N610 | 25 vol % $Yb_2Si_2O_7$ AS-N610 | 25 vol % $Yb_2Si_2O_7$ AS-N720 | 25 vol % $(Y_{0.8}Yb_{0.2})_2Si_2O_7$ AS-N720 | AS-N610 | AS-N720 |
| Difference in Thermal Expansion Coefficient ($\times 10^{-6}$/K) | 2 | 0.85 | 0.1 | 1.7 | 1.7 | 2.3 | 4 |

As illustrated in Table 3, since in Examples 1 to 5, the difference in thermal expansion coefficient between the heat-shielding coating layer and the substrate was $3 \times 10^{-6}$/K or less, thermal stress in the top coat was alleviated. Particularly, in Examples 2 to 5, the difference in thermal expansion coefficient was less than $2 \times 10^{-6}$/K, and heat cycle durability was improved as compared to Comparative Examples 1 and 2.

Table 4 illustrates a difference in thermal expansion coefficient between a substrate and a heat-shielding coating layer (at room temperature to 1200° C.) in the case of forming a coated member having a configuration illustrated in FIG. 6. As the substrate, a SiC fiber-reinforced SiC matrix composite (Tyrannohex, Ube Industries, Ltd., thermal expansion coefficient: $4 \times 10^{-6}$/K (at room temperature to 1200° C.)) was used.

In Table 4, "YbSZ" is stabilized zirconia to which 16 wt % of $Yb_2O_3$ was added.

TABLE 4

|  | Example 6 | Example 7 | Example 8 | Example 9 | Comparative Example 3 |
|---|---|---|---|---|---|
| Third Layer | $Yb_2SiO_5$ + 50 vol % YbSZ | 15 vol % $(Y_{0.8}Yb_{0.2})_2Si_2O_7$ + 15 vol % $(Y_{0.8}Yb_{0.2})_2SiO_5$ + 70 vol % YbSZ | $Yb_2SiO_5$ + 50 vol % YbSZ | $Yb_2SiO_5$ + 50 vol % YbSZ | YbSZ |
| Second Layer | $Yb_2SiO_5$ | $Yb_2SiO_5$ | $Yb_2SiO_5$ | $Y_2SiO_5$ | $Y_2SiO_5$ |
| First Layer | 50 vol % $(Y_{0.8}Yb_{0.2})_2Si_2O_7$ + 50 vol % $(Y_{0.8}Yb_{0.2})SiO_6$ | 50 vol % $(Y_{0.8}Yb_{0.2})_2Si_2O_7$ + 50 vol % $(Y_{0.8}Gd_{0.2})_2SiO_5$ | 50 vol % $(Y_{0.8}Gd_{0.2})_2Si_2O_7$ + 50 vol % $(Y_{0.8}Yb_{0.2})_2SiO_5$ | 50 vol % $(Y_{0.8}Yb_{0.2})_2Si_2O_7$ + 50 vol % $Y_2SiO_5$ | 50 vol % $Y_2Si_2O_7$ + 50 vol % $Y_2SiO_5$ |
| Bond Coat | Si | Si | Si | Si | Si |
| Difference in Thermal Expansion Coefficient between Third and Second Layers ($\times 10^{-6}$/K) | 1.5 | 1.5 | 1.5 | 1.5 | 2.9 |
| Difference in Thermal Expansion Coefficient between Second and First Layers ($\times 10^{-6}$/K) | 1.9 | 1.9 | 1.8 | 1.9 | 1.9 |
| Difference in Thermal Expansion Coefficient between First Layer and Base ($\times 10^{-6}$/K) | 1.5 | 1.5 | 1.6 | 1.5 | 1.5 |

As illustrated in Table 4, since in Examples 6 to 9, the differences in thermal expansion coefficient between the first layer and the base, between the first and second layers, and between the second and third layers were $3\times10^{-6}$/K or less, thermal stress in the top coat was alleviated. Particularly, in Examples 6 to 9, the difference in thermal expansion coefficient was less than $2\times10^{-6}$/K, and heat cycle durability was improved as compared to Comparative Example 3.

REFERENCE SIGNS LIST

100, 200 Coated member
101, 201 Substrate
102 Heat-shielding coating layer
202 Bond coat
203 Top coat
204 First layer
205 Second layer
206 Third layer

The invention claimed is:

1. A method of manufacturing a coated member, the method comprising:
    forming a heat-shielding coating layer on a substrate by spraying particles onto the substrate made of a silicon-based ceramic or a ceramic fiber-reinforced ceramic matrix composite, the particles being obtained by mixing any one of rare earth disilicate powder, rare earth monosilicate powder and mixed powder of the rare earth disilicate powder and the rare earth monosilicate powder with ytterbia-stabilized zirconia powder containing ytterbia in a content of 8 wt % or more and 27 wt % or less and diffusion heat-treating the obtained mixed powder at a temperature of 1300° C. or more and 1700° C. or less,
    wherein the rare earth disilicate powder is made a $(Y_{1-a}[Ln_1]_a)_2Si_2O_7$ solid solution (here, $Ln_1$ is any one of Sc, Yb, and Lu, a is 0.05 or more and less than 1 when $Ln_1$ is Sc, and a is 0.2 or more and less than 1 when $Ln_1$ is Yb or Lu, and
    the rare earth monosilicate powder is made of a $(Y_{1-b}[Ln_1']_b)_2SiO_5$ solid solution (here, $Ln_1'$ is any one of Sc, Yb, and Lu, and $0<b\leq 0.5$).

2. The method of claim 1, wherein the substrate is made of an oxide-based ceramic fiber-reinforced oxide-based ceramic matrix composite or a SiC fiber-reinforced SiC matrix composite.

3. The method of claim 2, wherein the oxide-based ceramic fiber-reinforced oxide-based ceramic matrix composite is an $Al_2O_3$ fiber-reinforced $Al_2O_3$ matrix composite.

4. The method of claim 1, wherein an addition amount of the ytterbia-stabilized zirconia in the particles is 50 vol % or more and 90 vol % or less.

5. The method of claim 1, wherein any one of the rare earth disilicate powder, the rare earth monosilicate powder, and the mixed powder thereof is mixed with the ytterbia-stabilized zirconia at a mixing ratio at which a difference in thermal expansion coefficient between the substrate and the heat-shielding coating layer is less than $3\times10^{-6}$/K.

6. A method of manufacturing a coated member, the method comprising:
    forming a heat-shielding coating layer on a substrate by spraying particles onto the substrate made of a silicon-based ceramic or a ceramic fiber-reinforced ceramic matrix composite, the particles being obtained by mixing any one of rare earth disilicate powder, rare earth monosilicate powder and mixed powder of the rare earth disilicate powder and the rare earth monosilicate powder with ytterbia-stabilized zirconia powder containing ytterbia in a content of 8 wt % or more and 27 wt % or less and diffusion heat-treating the obtained mixed powder at a temperature of 1300° C. or more and 1700° C. or less,
    wherein the rare earth disilicate powder is made of any one of a $(Y_{1-c}[Ln_2]_c)_2Si_2O_7$ solid solution (here, $Ln_2$ is any one of Nd, Sm, Eu, and Gd, c is 0.1 or more and less than 1 when $Ln_2$ is Nd, Sm, or Eu, and c is 0.2 or more and less than 1 when $Ln_2$ is Gd, and
    the rare earth monosilicate powder is made of a $(Y_{1-d}[Ln_2']_d)_2SiO_5$ solid solution (here, $Ln_2'$ is any one of Nd, Sm, Eu, and Gd, and $0<d\leq 0.5$).

7. The method of claim 6, wherein the substrate is made of an oxide-based ceramic fiber-reinforced oxide-based ceramic matrix composite or a SiC fiber-reinforced SiC matrix composite.

8. The method of claim 7, wherein the oxide-based ceramic fiber-reinforced oxide-based ceramic matrix composite is an $Al_2O_3$ fiber-reinforced $Al_2O_3$ matrix composite.

9. The method of claim 6, wherein an addition amount of the ytterbia-stabilized zirconia in the particles is 50 vol % or more and 90 vol % or less.

10. The method of claim 6, wherein any one of the rare earth disilicate powder, the rare earth monosilicate powder, and the mixed powder thereof is mixed with the ytterbia-stabilized zirconia at a mixing ratio at which a difference in thermal expansion coefficient between the substrate and the heat-shielding coating layer is less than $3\times10^{-6}$/K.

* * * * *